(12) United States Patent
Terry et al.

(10) Patent No.: US 10,519,075 B2
(45) Date of Patent: *Dec. 31, 2019

(54) SOLID-ROCKET PROPELLANTS

(71) Applicant: Purdue Research Foundation, West Lafayette, IN (US)

(72) Inventors: Brandon C Terry, Lafayette, IN (US); Steven F Son, West Lafayette, IN (US); Ibrahim E Gunduz, Lincoln, NE (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/814,871

(22) Filed: Nov. 16, 2017

(65) Prior Publication Data
US 2018/0079697 A1 Mar. 22, 2018

Related U.S. Application Data

(63) Continuation of application No. 15/398,695, filed on Jan. 4, 2017, now Pat. No. 9,850,182, which is a continuation of application No. PCT/US2016/021370, filed on Mar. 8, 2016.

(60) Provisional application No. 62/130,108, filed on Mar. 9, 2015, provisional application No. 62/130,122, filed on Mar. 9, 2015.

(51) Int. Cl.
| | | |
|---|---|---|
| *C06B 33/06* | (2006.01) | |
| *C06B 23/02* | (2006.01) | |
| *C06B 45/10* | (2006.01) | |
| *F02K 9/10* | (2006.01) | |
| *C06B 29/22* | (2006.01) | |
| *C06B 45/18* | (2006.01) | |
| *C06B 33/00* | (2006.01) | |
| *D03D 23/00* | (2006.01) | |
| *D03D 43/00* | (2006.01) | |
| *C08L 1/18* | (2006.01) | |
| *C08L 33/20* | (2006.01) | |
| *C08L 47/00* | (2006.01) | |
| *C08L 75/04* | (2006.01) | |
| *C22C 21/00* | (2006.01) | |

(52) U.S. Cl.
CPC .............. *C06B 33/06* (2013.01); *C06B 23/02* (2013.01); *C06B 29/22* (2013.01); *C06B 45/10* (2013.01); *C06B 45/105* (2013.01); *C06B 45/18* (2013.01); *F02K 9/10* (2013.01); *C08L 1/18* (2013.01); *C08L 33/20* (2013.01); *C08L 47/00* (2013.01); *C08L 75/04* (2013.01); *C22C 21/00* (2013.01)

(58) Field of Classification Search
USPC .......................................... 149/37, 42, 108.2
See application file for complete search history.

(56) References Cited

U.S. PATENT DOCUMENTS

| | | | | |
|---|---|---|---|---|
| 3,634,049 A * | 1/1972 | Burns | ...................... | B01J 19/06 44/265 |
| 9,850,182 B2* | 12/2017 | Terry | ...................... | C06B 45/18 |
| 2008/0289733 A1* | 11/2008 | Gany | ...................... | C06B 45/00 149/1 |

* cited by examiner

*Primary Examiner* — James E McDonough
(74) *Attorney, Agent, or Firm* — D'Hue Law LLC; Cedric A. D'Hue

(57) ABSTRACT

Solid-fuel rocket propellants comprising an oxidizer, an oxophilic metal-halophilic metal formulation, and a binder are described herein. Further described are processes for preparing such propellants and methods of reducing hydrogen chloride production via the combustion of such propellants. Non-limiting examples of such formulations include aluminum-lithium alloys.

12 Claims, 8 Drawing Sheets

SOLID-ROCKET PROPELLANTS

CROSS-REFERENCE TO RELATED APPLICATIONS

This application is a continuation of U.S. patent application Ser. No. 15/398,695 filed Jan. 4, 2017, which is a continuation of and claims the benefit of PCT international application number PCT/US2016/021370, filed Mar. 8, 2016, which claimed benefit of U.S. provisional application No. 62/130,108, filed Mar. 9, 2015 and U.S. provisional application No. 62/130,122, filed Mar. 9, 2015, the contents of which are hereby incorporated by reference in their entirety into this disclosure.

STATEMENT OF GOVERNMENT INTEREST

This invention was made with government support under FA9550-13-1-0004 awarded by the United States Air Force, and 32 CFR 168a awarded by the Department of Defense. The government has certain rights in the invention.

BACKGROUND

The most common oxidizer used in solid rocket propellants is ammonium perchlorate ("AP"), $NH_4ClO_4$. This oxidizer is used because of its high oxygen content and large gas volume that is generated during combustion. However, the chlorine in the oxidant generally favors formation of hydrogen chloride as its primary product species. In common propellant formulations using AP, as much as 98% of the available chloride ion may be converted to hydrogen chloride. Hydrogen chloride pollution has serious negative consequences both to the environment and the ozone layer and is a major contributor to launch site equipment corrosion. Hydrogen chloride also forms nucleation sites for aerosolized water products which contributes to secondary smoke formation from exhaust plumes thereby making rockets easier to detect, which is a disadvantage for some applications.

There are three methods that have been investigated generally for hydrogen chloride reduction in composite rocket propellants, namely using reduced chlorine propellants, neutralizing hydrogen chloride, and the use of scavengers.

Using reduced or non-chlorine containing oxidizers reduces or eliminates hydrogen chloride formation, though generally at an unacceptable loss in performance or increase in detonation sensitivity. Ammonium nitrate ("AN") has been widely investigated as an AP replacement, but its performance has been shown to be much lower than AP and with less ballistic tailorability. Others have investigated incorporating nitrate esters and/or nitroamines in place of all or part of the AP oxidizer. While these energetic formulations have been widely used for their high performance, they are often more sensitive and are considered Class 1.1 propellants which make their handling substantially more dangerous.

Acid-base chemistry has been investigated as a way to neutralize hydrogen chloride formed from solid rocket propellants by using magnesium as a fuel in propellants. When burned with AP, magnesium oxide and hydrogen gas are formed. Hydrogen gas will subsequently after burn with ambient oxygen outside of the rocket motor to form water which in turn reacts with the magnesium oxide to form magnesium hydroxide. The magnesium hydroxide may then react with hydrogen chloride to form magnesium chloride and water. While this propellant has adequate theoretical performance and neutralizing effects, it also has a low density thus requiring a heavier loading and a serious disadvantage in that it requires sufficient atmospheric oxygen to combust hydrogen. Due to the low levels of oxygen at higher altitudes, this approach has limited applicability.

Another possible method for reducing hydrogen chloride formation would be to use strongly halophilic materials, such as alkali metals, to "scavenge" chlorine ions during combustion to form alkali-metal chlorides. Because of the high reactivity of these materials and potential health effects, alkali metals are generally not used as neat elemental metals in formulations. Therefore, alkali metal nitrates, such as $LiNO_3$ and $NaNO_3$ have been used to stably introduce the halophilic material, replacing a stoichiometric amount of AP. While these formulations do reduce the hydrogen chloride formation during combustion, they do so at an unacceptable loss to performance. It has been shown that the addition of nitroamines to the formulation can offset this performance deficit to some degree, but their addition result is a Class 1.1 propellant, which is extremely dangerous to handle.

While some general research into dual oxophilic-halophilic fuel combinations has been investigated as a means to improve specific impulse ($I_{SP}$) when combined with a chlorine-containing oxidant, such as disclosed in U.S. Pat. No. 3,133,841, such use as hydrogen chloride scavengers has previously not been investigated and the range of alloys presented lack suitable performance characteristics. There is, therefore, an unmet need for a high performance solid-fuel rocket propellant capable of significantly reducing hydrogen chloride formation.

SUMMARY OF INVENTION

In one aspect of the invention, a solid-rocket propellant comprising an Al—Li alloy with a weight ratio of Li to Al between about 14% and 34%, an oxidizer, and a binder is provided.

In another aspect of the invention, a process for reducing hydrogen chloride formation in solid-rocket combustion comprising the steps of combining a halophilic metal with an oxophilic metal to form an alloy, combining the alloy with an oxidizer and a binder to form a propellant, and combusting the propellant is provided.

In a further aspect of the invention, a method for producing a solid-form propellant is provided comprising formulating a halophilic metal with an oxophilic metal to form a plurality of formulated oxophilic-halophilic metal particles, and combining the formulated oxophilic-halophilic particles with a chlorine-containing oxidizer and a binding agent to form a solid-form propellant.

In a still further aspect of the invention, a solid-rocket propellant is provided comprising an oxophilic metal-halophilic metal formulation, a binder, and an oxidant is provided.

In yet another aspect of the invention, a chloride containing solid-rocket propellant is provided where substantially no hydrogen chloride is produced upon combustion.

In still a further aspect of the invention, a method for reducing large molten droplets ("LMD") in solid-rocket fuel propellants is provided.

DETAILED DESCRIPTION

Figure 1A:
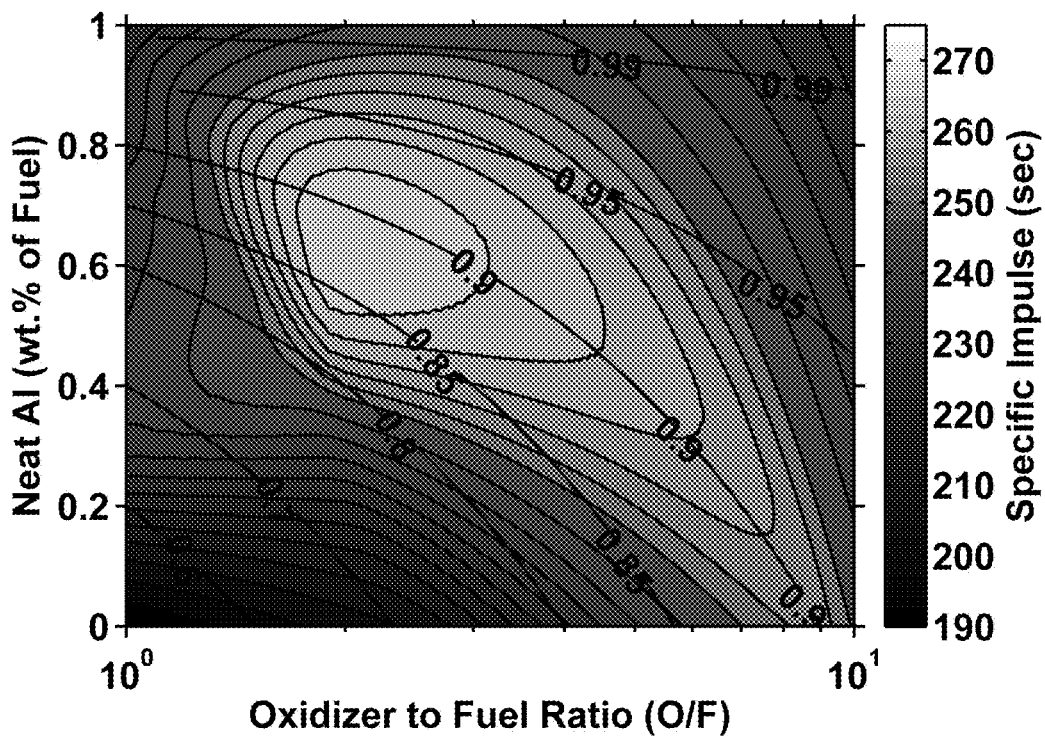
FIG. 1A shows the thermochemical equilibrium results for neat aluminum/AP/HTPB propellant formulations. Specific impulse contour lines above 250 seconds represent a step of 2.5 seconds, contour lines below 250 seconds represent a step of 5 seconds, and transverse contour lines represent propellant solids loading.

A solid-rocket propellant is provided which comprises a binder, an oxidizer and an oxophilic metal-halophilic metal formulation. The formulation is selected so as to have the capability to reduce hydrogen chloride formation when a chlorine-containing oxidizer, such as AP is used as an oxidizer, while at the same time maintaining acceptable performance.

Thermochemical calculations as set forth in Example 1 and Example 2 show that binary oxophilic-halophilic fuels result in good performance when reacted with a chorine-containing oxidant. The halophilic fuel can be combined through alloying, mechanical activation, or encapsulation with a suitable oxophilic-metal fuel. The resulting formulated oxophilic-halophilic metal composition can then be combined with an oxidant and a binder to form a propellant. When combusted, the propellant results in reduced hydrogen chloride formation and improved performance.

By using this formulation approach, a stoichiometric oxophilic:halophilic (metal) ratio can be tailored to minimize hydrogen chloride formation, minimize non-alkali chloride species formation, and maximize performance. Both modeling and performance testing of propellants to illustrate certain embodiments of the invention were performed. For example, various aluminum-lithium alloy formulations showed both a predicted and experimental reduction of over 95% in the formation of hydrogen chloride gas. Further, modeling indicated a predicted about a greater than 2% increase in motor performance in specific impulse ($I_{sp}$), an important performance metric.

These modeling investigations involve theoretical performance calculations using various Al—Li ratios, as well as neat aluminum, neat lithium, and a baseline scavenged propellant replacing a portion of AP with $NaNO_3$. This work was completed to determine a range of lithium contents for which the Al—Li system could act as a high performance halide scavenger ("HPHS"), as set forth in Example 2. Examples of these ternary system simulations are presented in FIG. 1. The mixture ratios that yielded the highest specific impulse for each fuel additive are tabulated in Table 1 and their corresponding performance values are tabulated in Table 2. The mixture ratio with the highest HPHS value for the 80/20 Al—Li system is denoted by an asterisk (*) in Tables 1-2, and is the mixture ratio that was used for all experimental results. The solids loading differs at the highest HPHS value than the corresponding loading for maximum $I_{SP}$.

The performance values in Table 2 include specific impulse, impulse density, enthalpy change across the nozzle, chamber temperature, exhaust molecular weight, and the conversion of chlorine and alkali metal to HCl and MCl where "M" denotes alkali metal. Specific impulse has the following relationship:

$$I_{SP} \equiv \frac{I}{m_p g} \propto \sqrt{\Delta h} \propto \sqrt{\frac{T_0}{M}}$$

where I is the total impulse, $m_p$ is the propellant mass, g is standard gravity, $\Delta h$ is the enthalpy change across the nozzle, $T_0$ is the stagnation temperature of the combustion products, and M is the molecular weight of the combustion products. The first proportionality results from the assumptions that the exhaust velocity is constant and that there is isentropic flow through the nozzle, and is the relationship that Cheetah 7.0 equilibrium code uses to calculate $I_{SP}$ as set forth in Example 1. The second proportionality makes the assumptions that the exhaust products are an ideal and calorically perfect gas and shows that high chamber temperatures and low product molecular weights improve specific impulse.

Table 2 shows that the Al—Li system has higher specific impulse than either neat Al or Li, regardless of the amount of Li present in Al—Li. Additionally, it is shown that hydrogen chloride formation (% Cl) is significantly reduced with a lithium content of at least about 15% by weight.

TABLE 1

| Additive | AP [wt. %] | NaNO$_3$ [wt. %] | HTPB [wt. %] | Al [wt. %] | Li [wt. %] | Additive Content [%] | O/F [—] | Solids Loading [%] | Theoretical Density [g cm$^{-3}$] |
|---|---|---|---|---|---|---|---|---|---|
| Neat Al | 66.7 | — | 11.5 | 21.8 | — | 65.6 | 2.0 | 88.5 | 2.00 |
| Neat Li | 85.9 | — | 8.9 | — | 5.9 | 41.6 | 6.1 | 91.8 | 1.36 |
| Al—Li (5 wt. % Li) | 65.6 | — | 11.1 | 22.2 | 1.2 | 67.9 | 1.9 | 88.9 | 1.99 |
| Al—Li (10 wt. % Li) | 64.2 | — | 10.8 | 22.5 | 2.5 | 69.9 | 1.8 | 89.2 | 1.97 |
| Al—Li (15 wt. % Li) | 63.0 | — | 11.0 | 22.0 | 3.9 | 70.2 | 1.7 | 89.0 | 1.95 |
| Al—Li (20 wt. % Li) | 63.0 | — | 11.0 | 20.7 | 5.2 | 70.2 | 1.7 | 89.0 | 1.92 |
| *Al—Li (20 wt. % Li) | 61.5 | — | 11.7 | 21.4 | 5.4 | 69.6 | 1.6 | 88.3 | 1.91 |

TABLE 1-continued

| Additive | AP [wt. %] | NaNO$_3$ [wt. %] | HTPB [wt. %] | Al [wt. %] | Li [wt. %] | Additive Content [%] | O/F [—] | Solids Loading [%] | Theoretical Density [g cm$^{-3}$] |
|---|---|---|---|---|---|---|---|---|---|
| Al—Li (25 wt. % Li) | 63.0 | — | 11.0 | 19.5 | 6.5 | 70.2 | 1.7 | 89.0 | 1.89 |
| Al—Li (30 wt. % Li) | 63.0 | — | 11.0 | 18.2 | 7.8 | 70.4 | 1.7 | 89.0 | 1.86 |
| Neat Al, NaNO$_3$ | 36.0 | 28.3 | 11.9 | 23.7 | — | 66.6 | 1.8 | 88.1 | 2.09 |

TABLE 2

| Additive | Max I$_{SP}$ [sec] | Impulse Density [g-sec cm$^{-3}$] | Δh$_{chamber-Exit}$ [kJ g$^{-1}$] | T$_{Chamber}$ [K] | Mol. Wt. [kg kmol$^{-1}$] | Cl → HCl [%] | Cl → MCl [%] | M → MCl [%] | HPHS [%] |
|---|---|---|---|---|---|---|---|---|---|
| Neat Al | 264.8 | 528.7 | 3.37 | 3614 | 27.9 | 98.3 | — | — | 1.7 |
| Neat Li | 263.4 | 358.1 | 3.34 | 3204 | 27.3 | 1.8 | 95.0 | 82.1 | 98.2 |
| Al—Li (5 wt. % Li) | 267.3 | 531.1 | 3.44 | 3658 | 27.8 | 68.5 | 30.0 | 99.3 | 31.5 |
| Al—Li (10 wt. % Li) | 269.9 | 532.6 | 3.50 | 3679 | 27.6 | 34.0 | 65.0 | 98.6 | 66.0 |
| Al—Li (15 wt. % Li) | 271.8 | 529.3 | 3.55 | 3621 | 26.7 | 3.6 | 96.1 | 91.9 | 96.4 |
| Al—Li (20 wt. % Li) | 271.9 | 521.9 | 3.56 | 3553 | 26.2 | 1.9 | 97.8 | 70.3 | 98.1 |
| *Al—Li (20 wt. % Li) | 270.7 | 518.3 | 3.52 | 3450 | 25.5 | 0.3 | 99.0 | 67.1 | 99.1 |
| Al—Li (25 wt. % Li) | 272.7 | 515.7 | 3.58 | 3537 | 25.7 | 1.7 | 98.0 | 56.2 | 98.3 |
| Al—Li (30 wt. % Li) | 273.4 | 509.7 | 3.60 | 3547 | 25.3 | 1.5 | 98.2 | 46.9 | 98.5 |
| Neat Al, NaNO3 | 246.1 | 515.0 | 2.91 | 3508 | 30.7 | 15.2 | 84.2 | 77.5 | 84.8 |

Figure 2:
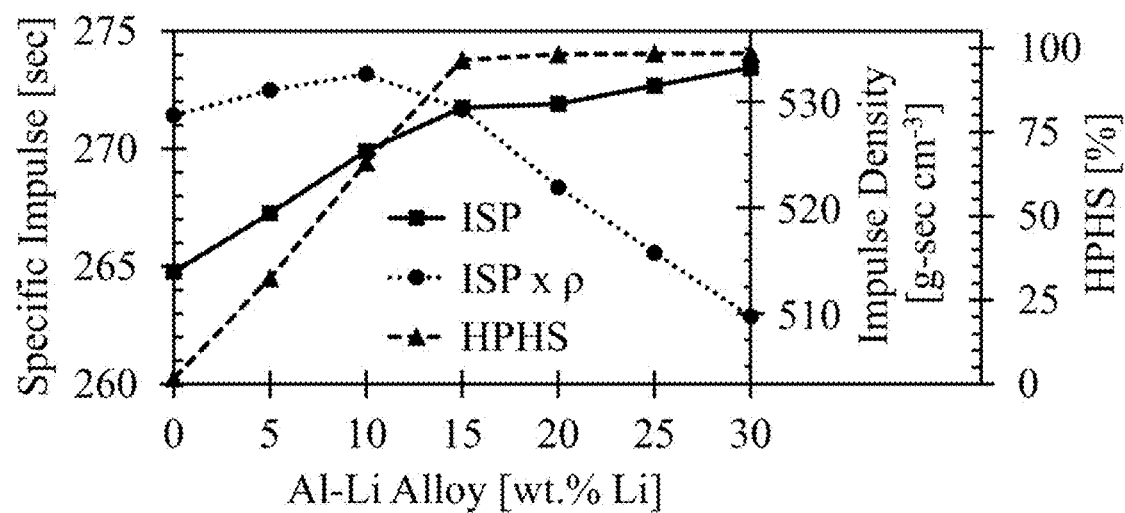
FIG. 2 shows the theoretical performance of the Al—Li system as a function of lithium content.
Figure 3:
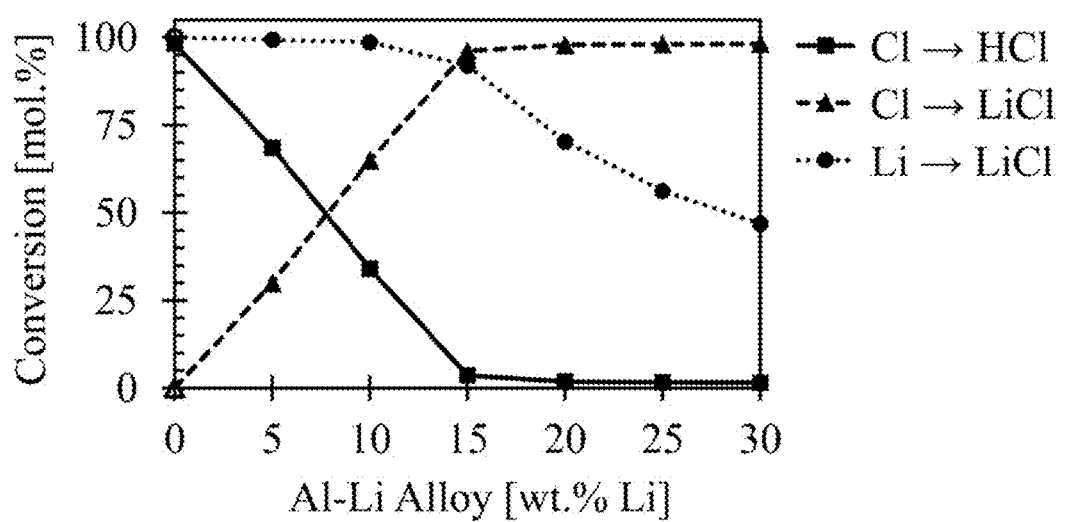
FIG. 3 shows the conversion of Cl→hydrogen chloride, Cl→LiCl, and Li→LiCl as a function of Li content in the fuel additive.

Data from Table 2 are represented in FIG. 2 and FIG. 3. The theoretical performance of the Al—Li system is shown in FIG. 2 as a function of lithium content. The data show that there is enough lithium present to stoichiometrically combine with the chlorine in the AP, thus yielding good performance as well as low hydrogen chloride content at values greater than about 15% by weight lithium. It is also shown that the theoretical performance of the Al—Li system, such as an alloy, continues to increase with increasing lithium content. However, it is shown in FIG. 3, that above about 15%, there is an excess of lithium in the fuel additive, thus forming lithium species other than lithium chloride. While these other lithium species are shown to increase performance above 15%, only LiCl is desirable for an environmentally cleaner formulation.

Figure 1B:
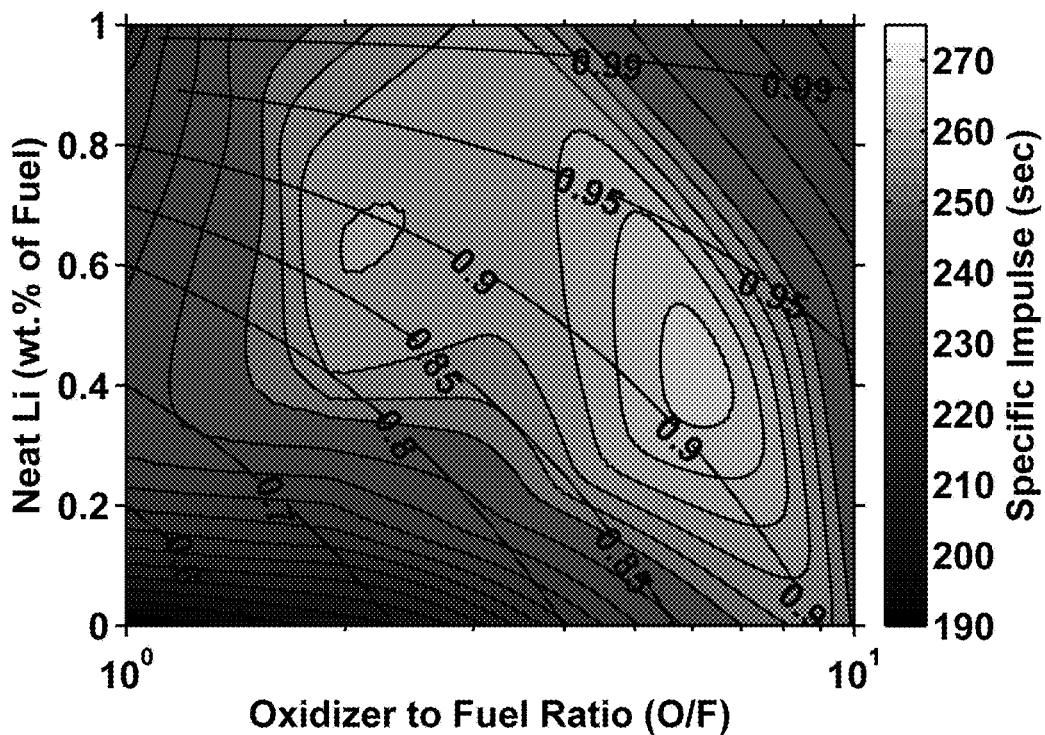
FIG. 1B shows the thermochemical equilibrium results for neat lithium/AP/HTPB propellant formulations. Specific impulse contour lines above 250 seconds represent a step of 2.5 seconds, contour lines below 250 seconds represent a step of 5 seconds, and transverse contour lines represent propellant solids loading.
Figure 1C:
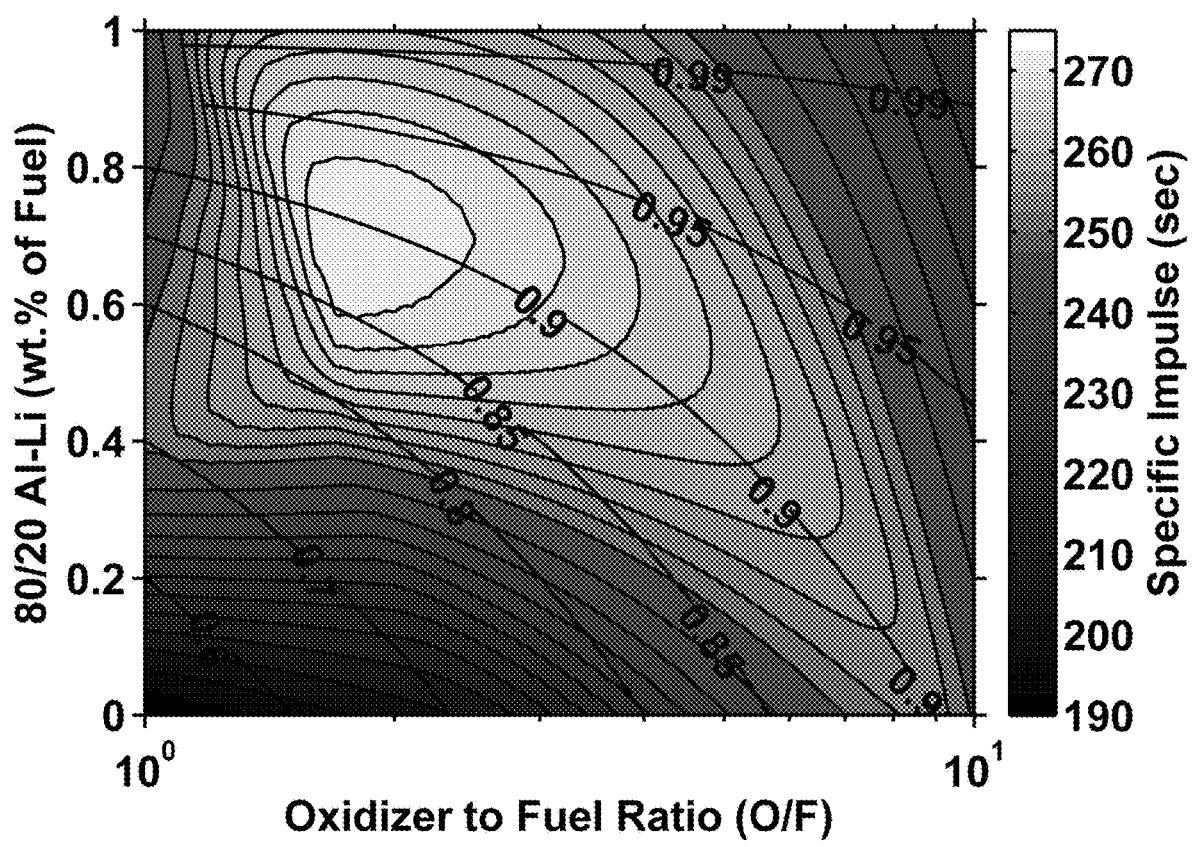
FIG. 1C shows the thermochemical equilibrium results for 80/20 aluminum-lithium/AP/HTPB propellant formulations. Specific impulse contour lines above 250 seconds represent a step of 2.5 seconds, contour lines below 250 seconds represent a step of 5 seconds, and the transverse contour lines represent propellant solids loading.

The performance advantages of an aluminum-lithium alloy over neat aluminum or neat lithium can be seen by reference to FIG. 1. The plots in FIG. 1 were calculated in accordance with Example 1. Contour lines represent I$_{SP}$ whereas transverse contour lines represent solids loading of the propellant. FIG. 1A and FIG. 1B show impulse performance for neat aluminum and neat lithium respectively as calculated in accordance with Example 1. Maximum I$_{SP}$ for each of these materials is less than that of a 20/80 lithium-aluminum alloy as seen in FIG. 1C. Performance decreases when NaNO$_3$ at a 56/44 weight percent AP/NaNO$_3$ (a standard formulation) is added to the propellant. These data are tabulated in Table 2 and it is seen that the I$_{SP}$ performance of the 20/80 alloy is 271.9 seconds whereas the neat Al and Li are only 264.8 seconds and 263.4 seconds respectively whereas the NaNO$_3$-spiked material only registers 246.1 seconds. The greater the I$_{SP}$, the more thrust that is produced from the same amount of propellant and, therefore, increased I$_{SP}$ is a desirable feature.

The Al—Li formulation leads to a higher specific impulse and lower combustion product molecular weight than either of the neat parent materials due to a number of factors. The replacement of some aluminum with lithium in the formulation results in the formation of some alumina product (molecular weight of $$101.9 \frac{g}{mol})$$

being replaced with lithium chloride ("LiCl") (molecular weight of $$42.4 \frac{g}{mol}).$$

Furthermore, alumina will predominantly stay in the condensed phase throughout the combustion event (boiling point of 2977° C., 1 atm), whereas LiCl will primarily remain gaseous (boiling point of 1382° C., 1 atm). In some cases, the LiCl may condense out during nozzle expansion, but a chamber pressure of 68.0 atm, optimally expanded to 1.0 atm, results in a theoretical nozzle exit temperature of 2070° C., well above the boiling temperature of LiCl. Additionally, replacing hydrogen chloride ("HCl") (molecular weight of $$36.5 \frac{g}{mol})$$

with LiCl only moderately increases the chlorine-based species molecular weight, but significantly lowers the global molecular weight by freeing up excess hydrogen gas (molecular weight of $$2.0 \frac{g}{mol}).$$

FIG. 3 illustrates thermochemical equilibrium calculations from Example 1 for the conversion of Cl to HCl and LiCl in the process of combusting the propellant. HCl formation shows a steady decrease towards baseline, especially as the weight percent of lithium increases above about 15%. At higher weight percentages, the amount of LiCl formed from HCl remains high whereas the amount of lithium products that are not LiCl increase.

According to the calculations of Example 1 and Example 2, an optimum HPHS propellant would be about 63% of AP, about 22% of an Al—Li formulation (such as an alloy) with a loading of about 83% Al and about 17% Li, and about 15% of HTPB of a binder, for a solids loading of 85%. Such a solid-rocket propellant would have a specific impulse of about 270.5 seconds, a hydrogen chloride content of about 2.1%, and a conversion of Li to LiCl efficiency of about 97.0% based on chlorine from the AP. The difference in values between such a propellant and interpolation based on Table 2 is due to a lower solids loading in this formulation.

In many embodiments of the invention, the oxophilic metal is aluminum and the halophilic metal is lithium and the formulation is an alloy, as that term is usually understood by those of ordinary skill in the art. In such embodiments, the weight ratio of lithium to aluminum in the alloy is between about 14% and about 34% by weight. Further embodiments include weight ratios of lithium to aluminum of between about 14% and 30%, between about 14% and 24%, between about 14% and 20%, and between about 16% and 18%, as well as values in between the weight ranges given. For example, separate embodiments of about 14%, 15%, 16%, 17%, 18%, 19%, or 20% are each further provided herein. When reporting values in weight percent, the understood variability by use of the word "about" is on the order of 1%. Thus, a weight percent of about 15% means 14% to 16%. The use of the word "about" is meant to modify all weight percent values set forth herein whether explicitly present or not.

The weight ratio of lithium is important to the performance of the propellant. When the weight percent of lithium is less than 14%, then the amount of hydrogen chloride that is formed increases rapidly as seen in FIG. 3. Weight ratios of greater than 34% result in poor impulse density (total thrust per unit volume of propellant). Particularly preferred ratios of the embodiments set forth herein are those where the phase of lithium-aluminum microcrystals in a lithium-aluminum alloy is in the simple cubic crystalline phase. Such a phase exists between about 12% and about 20% by weight lithium and is particularly advantageous. The crystalline phase provides optimum performance capabilities with respect to other phases within the acceptable weight range while also substantially reducing hydrogen chloride gas formation. Such a range is also important because as the lithium content increases over about 20% in, for example, an alloy, the amount of Li products forming, other than the preferred LiCl, increases substantially and free lithium is highly reactive. Such other products may be harmful to the environment whereas LiCl is relatively benign. Thus, while lithium amounts of greater than 20% may be used in a formulation with aluminum, it is preferred to use a formulation where the lithium content is in the range of between about 14% and about 20% by weight, the weight range between 12% and 14% leading to a higher hydrogen chloride formation. Another embodiment is when substantially all of the alloy is crystalline, which occurs at a weight of about 20% lithium and 80% aluminum.

In these and other embodiments of the invention, the weight percentage of the Al—Li formulation, such as an alloy, is between about 5% and about 40% by weight. Other embodiments include ranges between about 20% and about 40% by weight as well as between about 20% and about 30% by weight, as well as all values in between about 5% and about 40% such as about 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37% 38%, or 39%.

The propellants of the invention further include an oxidizer. The amount of oxidizer in the propellant is between about 55% and about 79% by weight. Other ranges include between about 55% and about 65% by weight, between about 58% and about 65% by weight, and between about 60% and about 64% by weight and all values in between including about 59%, 60%, 61%, 62%, 63%, 64%, 65%, 66%, 67%, 68%, 69%, 70%, 71%, 72%, 73%, 74%, 75%, 76%, 77%, or 78%. Oxidizers typically contain chlorine with a common oxidizer being ammonium perchlorate.

The invention further includes propellants containing a binder. Such binders are often organic. Examples of binders suitable for use herein include hydroxyl-terminated polybutadiene ("HTPB"), carboxyl terminated polybutadiene ("CTBP"), Polybutadiene acrylonitrile ("PBAN"), dicyclopentadiene ("DCPD"), Polyurethane ("PU"), Plasticized nitrocellulose ("PNC"), Glycidyl Azide polymers ("GAP"), oxetane polymers ("PolyNIMMO"), oxirane polymers ("polyGLYN"), bis-azidomethyloxetane/azideomethylmethyloxetane ("BAMO/AMMO") or combinations thereof. Such binders may be used to augment the fuel for combustion. In many embodiment of the invention, the binder is present between about 5% and about 25% by weight. Other ranges include between about 10% and about 20% by weight. Other ranges include between about 10% and about 16% and between about 11% and about 15% by weight and all values between about 5% and about 25% including about 6%, 7%, 8%, 9%, 10%, 11%, 12%, 13%, 14%, 15%, 16%, 17%, 18%, 19%, 20%, 21%, 22%, 23%, or 24%.

In certain embodiments of the invention, solid-rocket propellants are provided wherein the Al—Li formulation is an alloy, the oxidizer is ammonium perchlorate, and binder is one or more of HTPB, CTBP, PBAN, DCPD, PU, PNC, GAP, PolyNIMMO, polyGLYN, BAMO/AMMO or combinations thereof. In such embodiments, the amount of alloy present is between about 5% and about 40% by weight. Other embodiments include ranges between about 20% and about 40% by weight as well as between about 20% and about 30% by weight, as well as all values in between 5% and 40% such as about 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37% 38%, or 39%. The weight ratio of lithium to aluminum in such alloys is between about 14% and about 34% by weight, including between about 14% and 30%, between about 14% and 24%, between about 14% and 20%, and between about 16% and 18%, as well as about 15%, 16%, 17%, 18%, 19%, or 20%. In such embodiments, the amount of ammonium perchlorate is between about 55% and about 79% by weight. Other ranges include between about 55% and about 65% by weight, between about 58% and about 65% by weight, and between about 60% and about 64% by weight and all values in between including about 56%, 57%, 58%, 59%, 60%, 61%, 62%, 63%, 64%, 65%, 66%, 67%, 68%, 69%, 70%, 71%, 72%, 73%, 74%, 75%, 76%, 77%, or 78%. The amount of hydroxyl-terminated polybutadiene in such embodiments is between about 5% and about 25% by weight. Other ranges include between about 10% and about 20% by weight. Still other ranges include between about 10% and about 16% and between about 11% and about 15% by weight and all values between about 5% and about 25% including about 6%, 7%, 8%, 9%, 10%, 11%, 12%, 13%, 14%, 15%, 16%, 17%, 18%, 19%, 20%, 21%, 22%, 23%, or 24%.

Particle size can also influence performance characteristics in the solid-rocket propellant of the invention. Typical particle sizes for oxidizers such as ammonium perchlorate are between about 1 micron and about 400 microns. By "particle size" what is meant is the volume-weighted mean particle size. In embodiments, two different particle sizes are used when ammonium perchlorate is the oxidizer. In some such embodiments, the "coarse" particle size is between about 100 microns 400 microns, including between about 150 microns and 250 microns including all values in between such as about 200 microns. In the context of "particle size" the word "about" means plus or minus 10%. Thus, a value of about 100 microns means between 90 microns and 110 microns. The use of the word "about" is meant to modify all particle size measurement values set forth herein whether explicitly present or not. In some embodiments, the "fine" particle size is between about 1 micron and 75 microns, including between about 10 microns and 50 microns, and further including between about 10 microns and 30 microns including all values in between such as about 20 microns.

Figure 4:
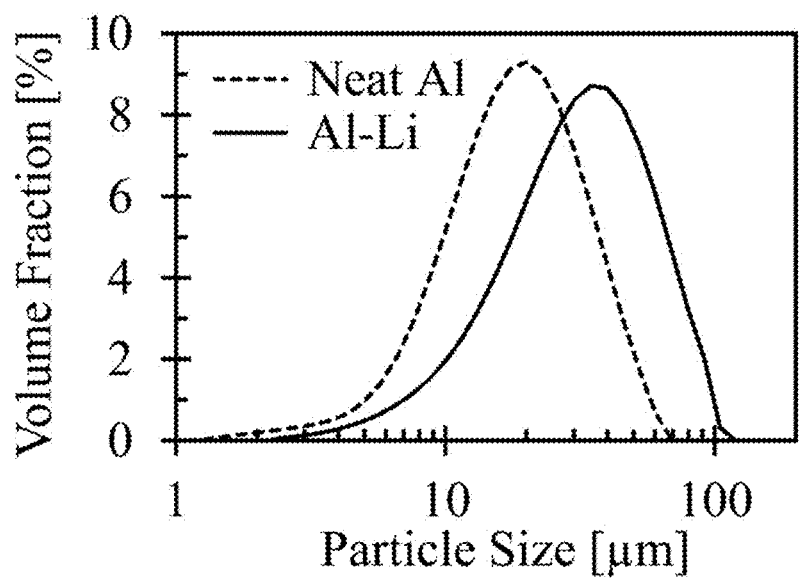
FIG. 4 is a particle size distribution curve of neat Al and Al—Li.

When the Al—Li formulation is an alloy, typical particle sizes are between about 10 microns and 200 microns including between about 10 microns and about 100 microns, including between about 20 microns and 50 microns, including between about 25 microns and 45 microns and values in between such as about 26, 27, 28, 29, 30, 31, 32, 33, 34, 35, 36, 37, 38, or 39 microns. A particle-size distribution curve for Al—Li alloy prepared according to Example 3 is set forth in FIG. 4. As particle size decreases, the formulations become hard or brittle which is disadvantageous from a handling and performance perspective.

The invention is also directed to chloride containing solid-fuel rocket propellants comprising an oxidizer, an oxophilic metal-halophilic metal alloy, and a binder wherein substantially no hydrogen chloride is produced upon combusting the fuel and wherein the alloy is capable of scavenging hydrogen chloride. In many of the embodiments, the alloy is an aluminum-lithium alloy, the oxidizer is ammonium perchlorate and the binder is HTPB. By "substantially no hydrogen chloride" what is meant is that less than 5% of the hydrogen chloride that would have been produced had a fuel been used that was not capable of scavenging hydrogen chloride to any appreciable extent such as neat Al. In other embodiments, substantially no hydrogen chloride includes less than 3%, or 2%, or 1%. Preferable combinations of lithium to aluminum in the alloy include the ratios set forth herein such as between about 14% and about 20% as a preferred range.

The invention is further directed to processes for making the solid-rocket propellants of the invention described herein. In some embodiments, processes are described wherein solid-form propellants comprising formulating a halophilic metal with an oxophilic metal to form a plurality of formulated oxophilic-halophilic metal particles and combining the formulated oxophilic-halophilic particles with a chlorine-containing oxidizer and a binder to form solid-form propellants. Often, the formulation is an alloy and the halophilic metal is selected from lithium, sodium, potassium, rubidium, or a combination thereof, and the oxophilic metal is selected from aluminum, beryllium, boron, magnesium, silicon, titanium, zirconium, or a combination thereof. A typical formulation is Al—Li. In such embodiments, the oxidizer is often ammonium perchlorate and the binder is hydroxyl-terminated polybutadiene. The invention is further directed to solid-rocket propellants so made.

Other than formulating by alloy, the invention includes other methods of formulation metals such as by mechanical activation, such as to use ball milling to form nanocomposite, micron-scale particles, or by encapsulation wherein halophilic metal is coated with the oxophilic metal or another agent.

The solid-rocket propellants of the invention may also include an additive to affect performance. Such an additive may be a high explosive, or a burn-rate modifier or a combination thereof. Examples of high explosives include HMX, RDS, CL-20, TNT, or co-crystals thereof. High explosives work by increasing $I_{SP}$. Examples of burn rate modifiers include FeO, $CuCr_2O_4$, $TiO_2$, graphene oxide, n-butyl ferrocene, copper oxide, cobalt oxide or combinations thereof. Burn-rate modifiers affect the rate of combustion.

The invention is further directed to processes for reducing hydrogen chloride formation during the combustion of solid-fuel rocket propellants by preparing a solid-fuel rocket propellants of the invention and combusting them. When compared to traditional fuels, such as aluminum, propellants of the invention, which contains a fuel such as a lithium-aluminum formulation, can substantially reduce hydrogen chloride formation as set forth in Table 2, for example. Additional advantages over single-metal fuels such as aluminum is that the formulations of the invention do not form LMD during the combustion process. LMD often form when aluminum is combusted which results in long combustion residence times which is disadvantageous and may also lead to incomplete combustion. The LMD cause both viscous and thermal disequilibrium in a solid rocket motor (not all heat and momentum is transferred to the working gasses), resulting in motor efficiency losses as high as 10% (i.e., two-phase flow losses).

It has been shown in the literature, that by introducing nanoscale polymer inclusions into aluminum particles, microexplosions may be induced at the propellant surface, although performance may be compromised. This use of microexplosions, therefore, may be able to reduce LMD formation.

With hydrocarbon fuels, microexplosions have been widely investigated, and implemented. Because the various components within the liquid fuels volatilize at different temperatures, the liquid with the lowest volatilization point will begin to outgas while other components are still in a condensed phase. By this premise, microexplosions are caused by internal bubble nucleation and growth from within a fuel droplet (i.e., intraparticle boiling), which causes droplet fragmentation. Microexplosive liquid fuels are typically advantageous as they promote rapid fuel atomization, which can reduce residence times and increase the completeness of combustion.

The formation of LMD from both aluminized APCP and 80/20 Al—Li APCP (see Example 3) was investigated by using a microscopic lens with backlighting. For the neat Al propellant, it was observed that the aluminum particles would sinter and either agglomerate or coalesce at the surface, and then finally eject as LMD (~50-100 μm diameter). In contrast, the Al—Li propellant was observed to form a bubbling melt-layer at the surface. Most LMD that were ejected from the melt-layer would either dispersively boil or undergo rapid expansion followed by microexplosion into an atomized mist within a few millimeters of the propellant surface.

The large disparity in boiling points between aluminum (2,519° C.) and lithium (1,342° C.) allows intraparticle boiling to occur within the Al—Li alloy droplets, effectively shattering and atomizing the droplet. This microexplosive phenomenon is analogous to missive multicomponent liquid fuels that microexplode and may facilitate increased metal combustion efficiency within a rocket motor and also decrease two-phase flow losses. Similar particle expansion and subsequent shattering was also observed for neat Al—Li alloy particles that were heated via a $CO_2$ laser at 213 W $cm^{-2}$ in air, which indicates that the chlorine is not required to induce shattering microexplosions with the Al—Li system, consistent with a previous study. However, the presence of chlorine appears to enhance microexplosions significantly (evident from equivalent $CO_2$ laser heating of an Al—Li/AP physical mixture), possibly due to the increase in surface heating that its presence provides (Li/Cl reactions)

Example 1—Modeling

Thermoequilibrium calculations were completed using Cheetah 7.0 (Lawrence Livermore National Laboratory, Edition LLNL-SM-599073) equilibrium code (JCZS product library and JCZ3 gas equation of state), assuming a chamber pressure of 6.89 MPa and ideal expansion to one standard atmosphere. Hydroxyl-terminated polybutadiene ("HTPB") was used as the binder for all simulations. The following Al—Li alloy compositions were used in these simulations (wt. % Li): 0, 5, 10, 15, 20, 25, 30, 100. Additionally, the Al/(56/44 wt. % AP/$NaNO_3$)/HTPB system was also investigated as a baseline scavenged propellant formulation. A total of 10,000 simulations were performed for each ternary system, systematically varying the oxidizer to fuel ratio (O/F) and the weight percent of fuel additive in the total fuel (total fuel=binder+fuel additive). Post processing of these calculations was performed in MATLAB.

All Al—Li alloy fuel additives were assumed to be a physical mixture of aluminum and lithium for all applicable equilibrium calculations, and the binary Al—Li alloy ratio was changed with each batch of simulations. Heats of formation, $\Delta_f H$, of the different Al—Li ratios actually vary due to alloy mixing and/or intermetallic formation enthalpy and are uncertain. It is recognized that this assumption yields $I_{SP}$ values that are artificially high due to increased theoretical combustion temperatures. However, this error is expected to be minor. The LiAl intermetallic phase has the largest $\Delta_f H$ magnitude in the Al—Li alloy range considered (measured to be between −9.77 to −21.8 kJ $mol^{-1}$), which yields a maximum $I_{SP}$ error of only 0.7%.

Example 2—Modeling with Scavenging

The following Equation (1) was used and evaluated as a "high performance halide scavenger" (HPHS) metric to account for chloride scavenging:

$$HPHS = \left(\frac{I_{SP}}{I_{SP,max}}\right) \times [100\% - (\% \text{ Cl} \rightarrow \text{HCl})] \quad (1)$$

where $I_{SP}$ is the specific impulse at the current mixture ratio, $I_{SP,max}$ is the maximum specific impulse obtainable with the ternary system, and % Cl→HCl is the percentage of available chlorine forming HCl at the current mixture ratio and at expansion to 1 atm pressure. This chosen performance metric places an equal weight on both specific impulse and HCl reduction for the purpose of evaluating a cleaner, high performance propellant formulation than otherwise available. An HPHS value of 100% indicates that complete HCl reduction is occurring at the system's peak specific impulse.

Example 3—Preparation of Propellant

Two solid composite propellants were prepared using the following fuel additives: A.) neat aluminum (Alfa Aesar, −325 mesh, 99.5% purity); and B.) 80/20 wt. % Al—Li alloy (stable LiAl intermetallic phase) (Sigma Aldrich). The as-received 80/20 Al—Li alloy was sieved to −325 mesh (<44 μm) to be comparable with the as-received neat aluminum powder. The particle size distributions for both powders were determined by laser diffraction (Malvern Mastersizer Hydro 2000 μP) using isopropyl alcohol as the dispersant medium. Surface imaging of both powders was performed by scanning electron microscopy (SEM, FEI Quanta 3D-FEG).

Imaging and particle sizing of the sieved neat aluminum (for comparison) and 80/20 Al—Li alloy powders showed that neat aluminum was nominally equiaxed in morphology and that 80/20 Al—Li alloy had an irregularly faceted morphology, typically with sharp/brittle surface features. The neat aluminum and Al—Li alloy powders had mean particle sizes (arithmetic) of 17.1 μm and 29.8 μm and volume weighted mean particle sizes (D) of 19.3 μm and 33.3 μm respectively.

The as-received 80/20 Al—Li alloy was sieved to −325 mesh (<44 μm) to be comparable with the as-received neat aluminum powder. The particle size distributions for both powders were determined by laser diffraction (Malvern Mastersizer Hydro 2000 μP) using isopropyl alcohol as the dispersant medium. Surface imaging of both powders was performed by scanning electron microscopy (SEM, FEI Quanta 3D-FEG).

The constituents used for the propellant formulations included: ammonium perchlorate (ATK, 20 μm and 200 μm) and HTPB (Firefox, R45) cured with an aromatic polyisocyanate (Desmodur, E744) as the binding agent. The following formulation was used to prepare approximately 20 grams of propellant for each mixture:

Metal Additive: 26.8%
Coarse AP, 200 μm: 49.2%
Fine AP, 20 μm: 12.3%
HTPB (11.5% curative): 11.7%

For comparison with theoretical performance predictions in FIG. 1A and FIG. 1C, these ratios correspond to an O/F of 1.60, a fuel additive wt. % of 69.6%, and a solids loading of 88.3%. No incompatibilities were observed with the aromatic polyisocyanate curative, though the working time of the wetted propellant was short (approximately 30 minutes).

Propellant constituents were resonant mixed (Resodyn LabRAM resonant mixer) in a 60 mL container (McMaster-Carr 42905T23) for 10 min at 90% intensity. Strands were then packed into 5.8 mm diameter cylindrical molds and cured in air for approximately 3 days at room temperature. The burning characteristics of the propellants were investigated using a color high-speed camera (Vision Research, Phantom v7.3) at 1000 fps in a vented fume hood.

Example 4—HCl Detection—Experimental Setup

Figure 8:
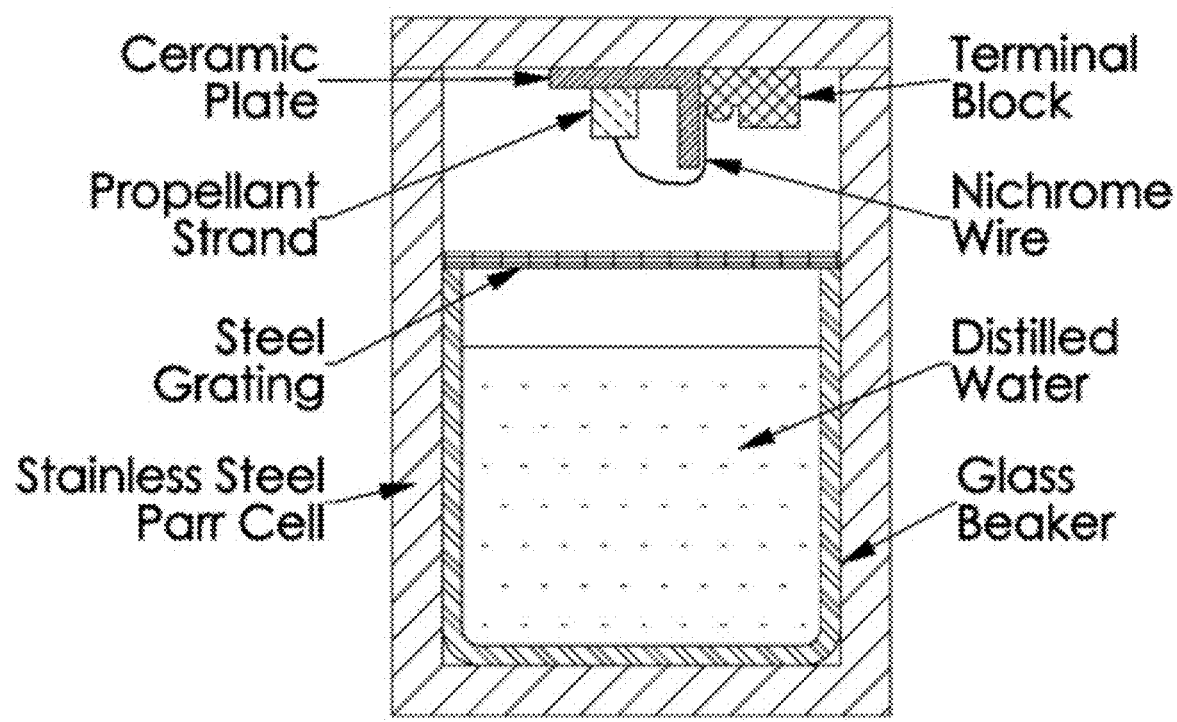
FIG. 8 is an HCl detection apparatus.

Both neat aluminum and Al—Li alloy propellants were burned in a closed 130 mL stainless steel Parr cell filled with 50 ml distilled water (i.e., wet bomb experiments), since this method has been used in previous studies. A schematic of the wet bomb experiment is shown in FIG. 8. Propellant strands (50.0±0.2 mg) were burned in argon at 2.5 MPa. The pH of the distilled water was measured with a digital pH meter (Omega, PHH-37) before and after each wet bomb experiment. The experiment was repeated three times for each propellant type.

Neat powders of AP (200 μm, Firefox) and stirred mixtures of 30/70 wt. % metal/AP were also analyzed using simultaneous differential scanning calorimetry/thermogravimetric analysis (DSC/TGA) (Netzsch Jupiter STA449 F1) with online gas analysis via mass spectrometry (MS, Netzsch Aeolos) and Fourier transform infrared absorption (FTIR, Bruker Tensor 37). The 30/70 wt. % ratio of metal/AP was chosen, as it is similar to the metal/AP ratio of the experimental propellants. Experiments were conducted on 3.1 mg samples of AP and 4.1 mg samples of metal/AP such that the total amount of AP contained within each sample was similar.

Prior to starting experiments, the DSC/TGA instrument's platinum furnace was evacuated and backfilled with purge gas three times. The samples were heated from room temperature to 700° C. at a heating rate of 20° C. min' under a steady flow of 40 mL min' of ultra-high purity argon (99.999 vol. %). The instrument exhaust was coupled to FTIR and MS instrumentation using a heated (200° C.) manifold and silica capillaries. The capillary was interfaced with the FTIR instrument's liquid nitrogen-cooled MCT detector via a heated (200° C.) Bruker TGA-IR light pipe. During DSC/TGA experiments, MS and IR data was recorded at temperature increments of approximately 3° C. with a mass range of 10 to 100 and IR spectral resolution of 2 $cm^{-1}$, respectively. Data was post-processed using the Netzsch Proteus software, NISTMS, Bruker Opus software packages, and NIST/EPA MS and FTIR libraries.

Example 5—Performance and HCl Detection—Results

The reduction in hydrogen chloride for Al—Li based propellants was evaluated using wet bomb combustion experiments and DSC/TGA coupled with simultaneous mass spectrometry and FTIR. For the wet bomb combustion experiments, a pH of 2.10±0.04 was measured for the aluminum propellant and a pH of 2.71±0.08 for the Al—Li propellant. This results in a 75.5±4.8% reduction of [$H^+$], which is proportional to the relative change in HCl concentration. The theoretical HCl reduction between the two propellants is 91% at this mixture ratio and pressure. It is possible that the small scale of the experiment inhibited complete combustion of the propellants due to quenching of the plume against the cold chamber walls and water, causing the theoretical and measured values to vary. However, the HCl reduction is still substantial. This experiment has been shown to be representative of other methods employed to quantify HCl content within rocket motor plumes and similar losses to complete combustion have been observed.

Figure 5:
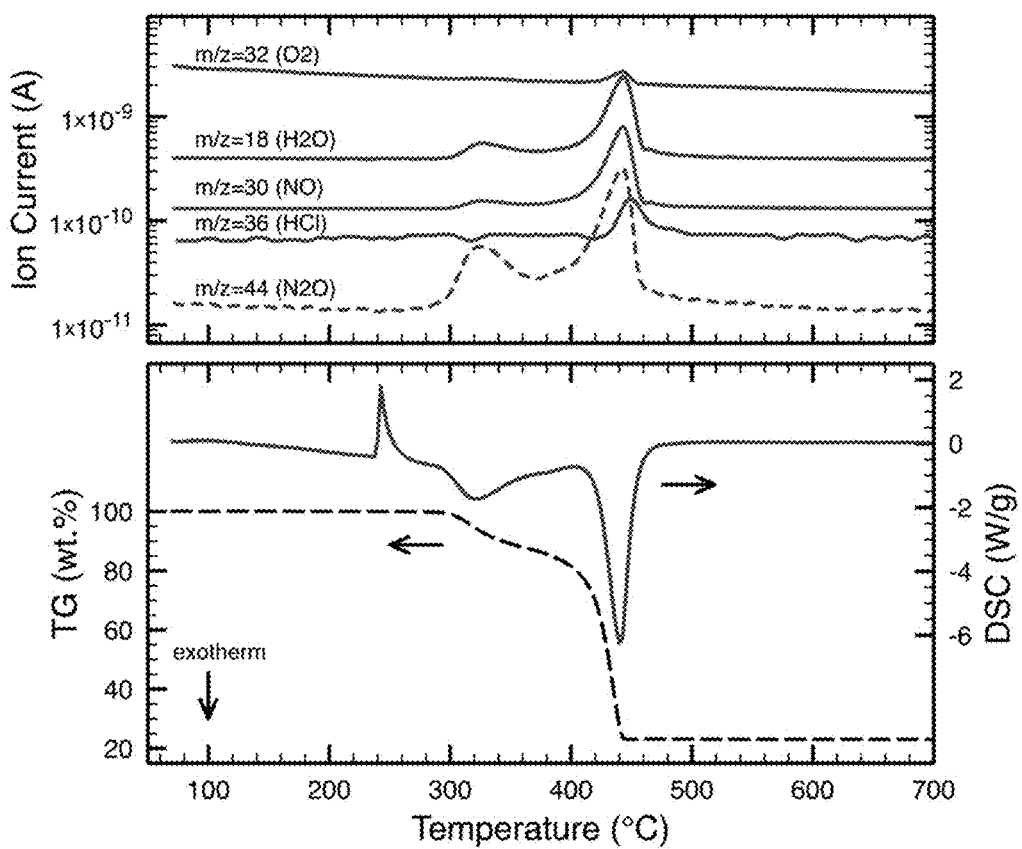
FIG. 5 are DSC/TGA and ion current curves for neat AP.
Figure 6:
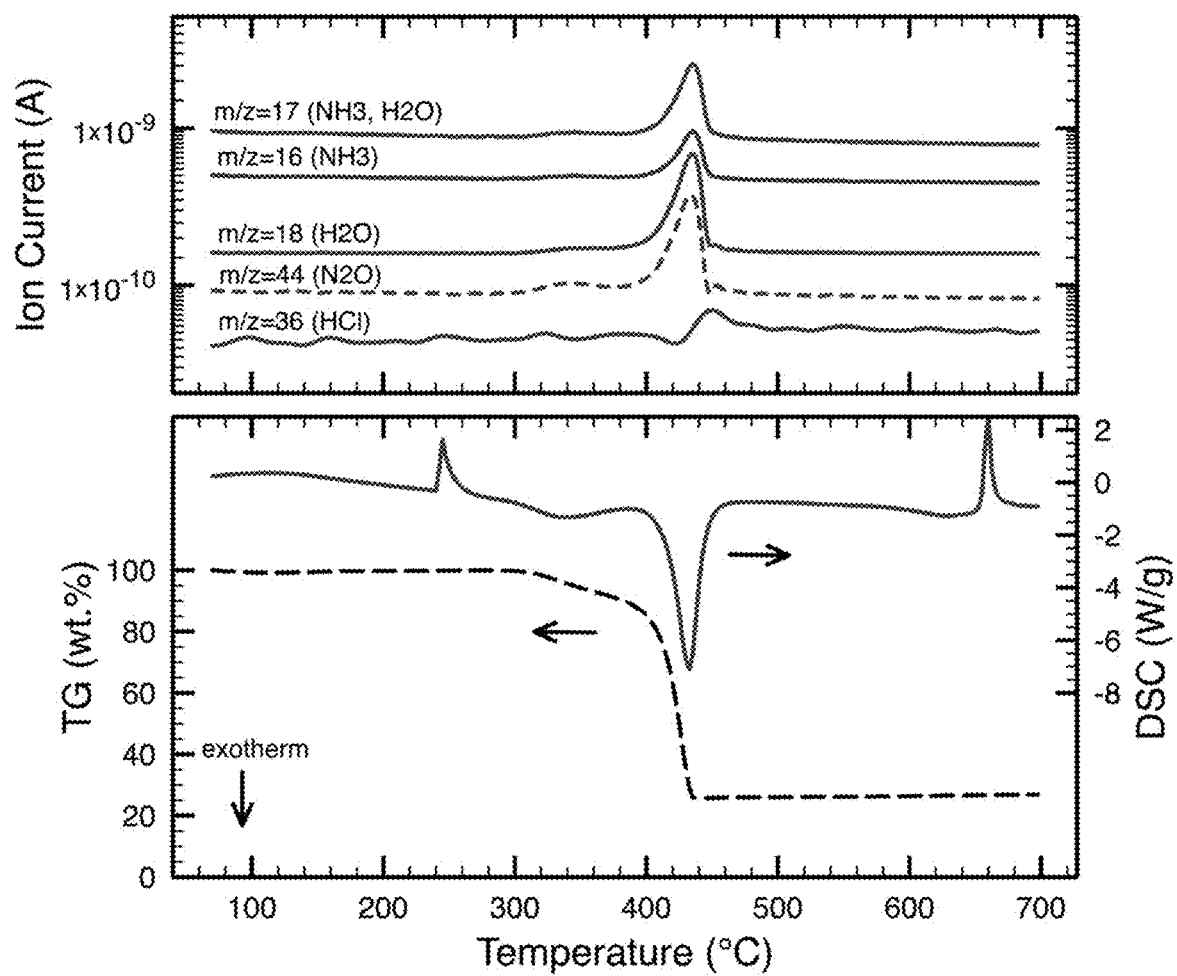
FIG. 6 are DSC/TGA and ion current curves for a 30% Aluminum/70% AP mixture.

The DSC/TGA-MS traces for neat AP in FIG. 5 suggests that there is an endothermic crystallographic phase change from orthorhombic to cubic at roughly 240° C. (no gas evolution detected), which is followed by a broad exothermic decomposition at roughly 300° C. (evolution of $N_2O$, NO, and $H_2O$ detected). This broad decomposition is followed by a rapid exothermic decomposition, with an onset at approximately 410° C. (evolution of HCl, $N_2O$, NO, $H_2O$, and $O_2$ detected), resulting in a total mass loss of 75%. A similar trend is apparent with the addition of aluminum as shown in FIG. 6, indicating that the presence of aluminum has little effect on the heating rate decomposition mechanisms of AP.

Figure 7:
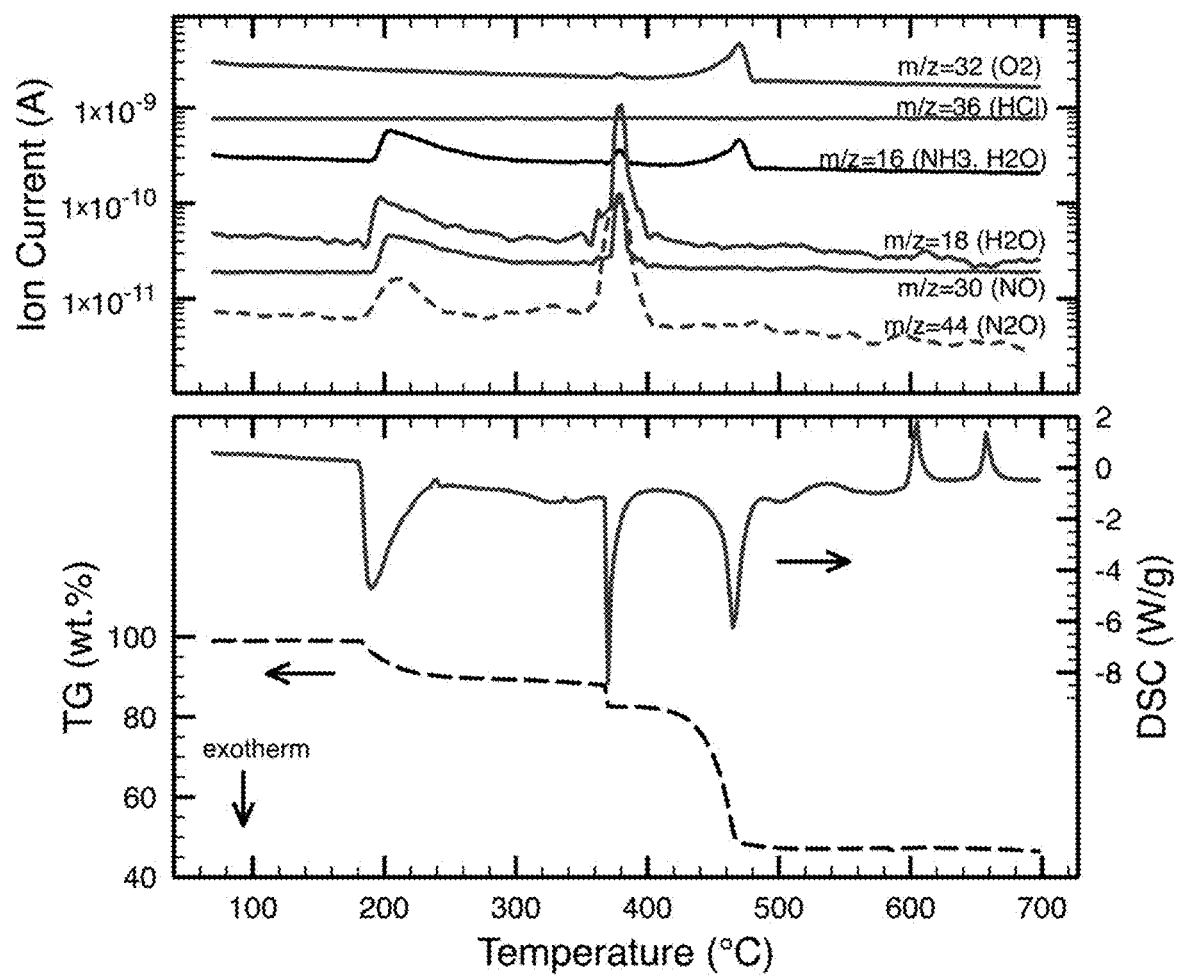
FIG. 7 are DSC/TGA and ion current curves for a 30% Aluminum-Lithium alloy/70% AP mixture.

When AP is in the presence of 80/20 Al—Li as illustrated in FIG. 7, exothermic decomposition of AP is reduced to approximately 180° C. (evolution of $NH_3$, NO, $N_2O$, and $H_2O$ detected), coincident with the melting point of lithium. The exothermic decomposition is immediately followed by a very weak endothermic phase change at roughly 240° C. (no new gas evolution detected). A second, rapid exothermic decomposition onsets at 360° C. (evolution of $NH_3$, NO, $N_2O$, $H_2O$, and $O_2$ detected), followed by a third exothermic decomposition onset at approximately 420° C. (evolution of $NH_3$ and $O_2$ detected). The exothermic processes were then followed by three distinct endothermic events at roughly 540° C., 600° C., and 660° C. (no new gas evolution detected). The last endotherm at 660° C. corresponds to the melting temperature of neat aluminum; the melting point of 80/20 Al—Li alloy is 695° C., suggesting that lithium was extracted from the Al—Li phase prior to 660° C., likely at the 180° C. exotherm. The roughly 600° C. endotherm may correspond to either the eutectic melting point in the Al—Li phase diagram (596° C., at 26 at. % lithium) or the melting point of LiCl (605° C.), which would indicate that LiCl formation had occurred prior to that temperature at one or more of the previous exothermic events. No HCl evolution was detected in the Al—Li/AP system. Furthermore, the presence of Al—Li alloy was able to reduce AP decomposition significantly from roughly 300° C. to 180° C. (well below the AP crystallographic phase change), likely due to LiCl formation. Moreover, mass spectral data show no evidence of HCl whereas HCl was detected in both FIG. 5 and FIG. 6.

Figure 9:
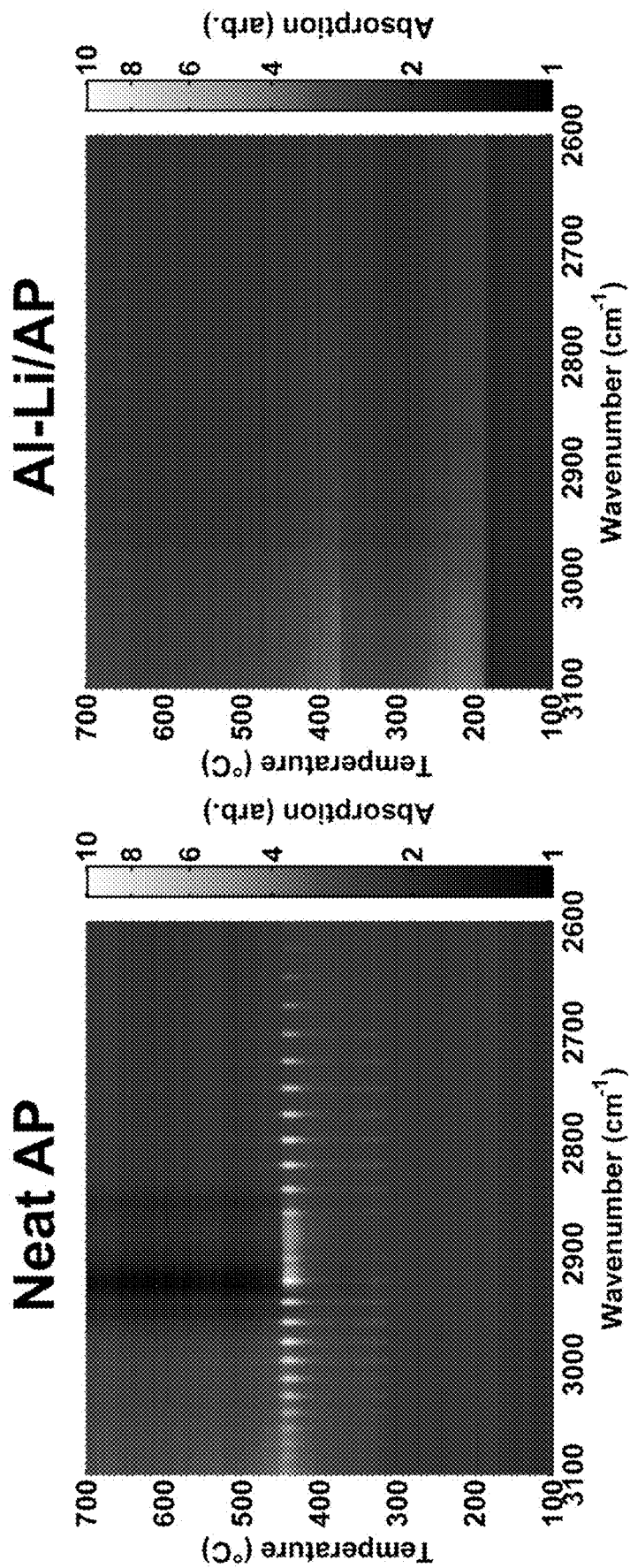
FIG. 9 are FTIR spectra of the decomposition of neat AP and a 30% Al—Li/AP mix.

FTIR measurements in FIG. 9 confirmed that neat AP yields a strong HCl vibration band between 3100-2600 $cm^{-1}$ at approximately 450° C. However, from FTIR measurements, it was also apparent that there is low-level formation of HCl at roughly 320° C., coincident with the first exotherm shown in FIG. 5. Virtually identical HCl vibrational bands at the same temperatures were evident with Al/AP FTIR measurements, again indicating that the presence of aluminum has little, if any, effect on the heating rate HCl evolution from AP decomposition. The FTIR measurements between 3100-2600 $cm^{-1}$ from Al—Li/AP indicates that there are some broad absorption features above 2800 $cm^{-1}$ near 180° C. and 360° C. (coincident with Al—Li/AP exothermic peaks), but no strong HCl vibrational bands are detected at any temperatures as were detected with neat AP. Close observation of the Al—Li/AP plots indicates that there may be some low-level HCl vibrational bands evident above 360° C., but absorption signal levels are near the instrument noise floor, thus HCl presence cannot be confirmed. However, the data are consistent with only a small amount of HCl.

The combustion characteristics varied greatly between the Al and Al—Li propellants. The propellant testing was performed in air at room temperature and atmospheric pressure. Neat aluminized propellant burning surfaces were dominated by large, bright aluminum droplets lifting off of the propellant surface. Droplets were suspended briefly above the burning surface, and then gently fell. The Al—Li propellant was characterized by a large, bright magenta flame and a relatively dark propellant surface. The magenta flame is indicative of LiCl emission. Very few coarse droplets were observed ejecting from the Al—Li surface. Such droplets because they are undesirable in rocket propellants can cause two-phase flow losses.

Example 6

In another embodiment, the Al—Li alloy may be cryomilled in order to safely reduce the particle size of the as-received powder until it is in a favorable range. The cryomilled Al—Li alloy can then be sieved to a desired particle size distribution in preparation for propellant mixing.

The materials used for composite propellant formulations can include: neat aluminum powder, Al—Li alloy, ammonium perchlorate, and a polybutadiene based binding agent. Propellant can be mixed according to the various mixture ratios outlined in Table 1. Increased feasibility in rocket motor systems (e.g., castability) may be realized by increasing binder contents in Table 1 to be between about 5% to about 25%, with the metal-to-AP ratios kept relatively constant. Mixing of the propellant can be accomplished via resonant mixing, shaker mixing, or physical mixing/stirring.

Example 7—Propellant

A rocket propellant of the following combination was prepared:
AP: 62.963%
Al—Li Alloy (80/20 wt. %): 18.594%
Aluminum: 3.443%
HTPB binder: 15.000%
Where the materials were sourced as set forth in Example 3. These were hand mixed with a spatula to prepare the propellant.

Example 8—Microexplosion Investigations

Solid form rocket propellants made according to Example 3 were used in this investigation. The burning characteristics of the propellant surfaces were investigated using a color high speed camera (Vision Research, Phantom v7.3) at 9900 fps and using a long distance microscopic optic (Infinity Photo-Optical, K2 Lens, CF2 objective). Imaging was performed in air and the propellant strands were backlit with a green light emitting diode (LED, model CREEXPE2-COL-X with a model 10003 20 mm narrow spot LED lens). The LED light source was expanded and aligned behind the propellants strands using two concave spherical aluminum mirrors (Edmond Optics, 152 cm focal length).

Laser ignition of loose powder samples was performed using a $CO_2$ laser (Coherent GEM 100A, 10.6 μm wavelength). The beam was focused using a ZnSe plano-convex focusing lens (ThorLabs, model LA7270-F), yielding a spot size diameter of 1.29 mm. Approximately 2 mg of powder (neat Al—Li or Al—Li/AP) was placed on a ceramic tile (OZM Research, Part Number BFST-Pt-100) and arranged into a thin row (<0.5 mm). Particle combustion was observed using high speed videography (Vision Research, Phantom v7.3) at 4000 fps and using a 200 mm macro lens (Nikon f/4 AF-D Micro-NIKKOR).

The invention claimed is:
1. A solid-rocket propellant comprising an aluminum-lithium alloy, an oxidizer, and a binder, wherein the ratio of lithium to aluminum in the alloy is between about 14% and about 34% by weight.
2. The solid-rocket propellant of claim 1, wherein the alloy is crystalline.
3. The solid-rocket propellant of claim 2 wherein the crystalline phase of the alloy is simple cubic.
4. The solid-rocket propellant of claim 1, wherein the amount of aluminum-lithium alloy in the propellant is between about 5% and about 40% by weight, the amount of oxidizer is between about 55% and about 79% by weight, and the amount of binder is between about 5% and about 25% by weight.
5. The solid-rocket propellant of claim 4, wherein the amount of aluminum-lithium alloy in the propellant is between about 20% and about 40% by weight, the amount of oxidizer is between about 55% and about 65% by weight, and the amount of binder is from about 8% to about 15%.
6. The solid-rocket propellant of claim 1, further comprising an additive.
7. The solid-rocket propellant of claim 6, wherein the additive is a high explosive, a catalyst, a burn-rate modifier, or a combination thereof.
8. The solid-rocket propellant of claim 1, wherein the oxidizer is ammonium perchlorate, and the binder is hydroxyl-terminated polybutadiene, carboxyl terminated polybutadiene, Polybutadiene acrylonitrile, dicyclopentadiene, Polyurethane, Plasticized nitrocellulose, Glycidyl Azide polymers, oxetane polymers, oxirane polymers, bis-azidomethyloxetane/azideomethylmethyloxetane or combinations thereof.
9. The solid-rocket propellant of claim 5, wherein the oxidizer is ammonium perchlorate, and the binder is hydroxyl-terminated polybutadiene, carboxyl terminated polybutadiene, Polybutadiene acrylonitrile, dicyclopentadiene, Polyurethane, Plasticized nitrocellulose, Glycidyl Azide polymers, oxetane polymers, oxirane polymers, bis-azidomethyloxetane/azideomethylmethyloxetane or combinations thereof and wherein the alloy is crystalline.
10. The solid-rocket propellant of claim 1, wherein the ratio of lithium to aluminum is between about 14% and 24% by weight.
11. The solid-rocket propellant of claim 10, wherein the ratio of lithium to aluminum by mass is between about 16% and 18% by weight.
12. The solid-rocket propellant of claim 11, wherein the oxidizer is ammonium perchlorate and the binder is hydroxyl-terminated polybutadiene, carboxyl terminated polybutadiene, Polybutadiene acrylonitrile, dicyclopentadiene, Polyurethane, Plasticized nitrocellulose, Glycidyl Azide polymers, oxetane polymers, oxirane polymers, bis-azidomethyloxetane/azideomethylmethyloxetane or combinations thereof.

* * * * *